United States Patent [19]

Sur

[11] Patent Number: 5,154,291

[45] Date of Patent: Oct. 13, 1992

[54] COMPACT AUDIO DISC STORAGE APPARATUS

[76] Inventor: Francis Y. Sur, 1429 Ala Lonomea St., Honolulu, Hi. 96818

[21] Appl. No.: 701,745

[22] Filed: May 17, 1991

[51] Int. Cl.⁵ .................... B65D 85/30; B65D 85/57; B65D 21/02; F21V 33/00

[52] U.S. Cl. .................................. 206/440; 206/555; 206/508; 206/509; 206/387; 312/9.11; 312/9.9; 362/154

[58] Field of Search ............... 206/444, 555, 556, 560, 206/508, 509, 387; 362/154, 32; 312/15, 10, 50, 111

[56] References Cited

U.S. PATENT DOCUMENTS

| | | | |
|---|---|---|---|
| 1,038,331 | 9/1912 | Exline | 206/509 |
| 3,047,157 | 7/1962 | Bergmann | 206/509 |
| 4,216,857 | 8/1980 | Huang | 206/509 |
| 4,272,795 | 6/1981 | Davis, Jr. et al. | 206/444 |
| 4,413,867 | 11/1983 | Mosebrook et al. | 206/509 |
| 4,722,034 | 1/1988 | Ackeret | 206/387 |
| 4,976,350 | 12/1990 | Fukumoto | 312/15 |
| 5,038,235 | 8/1991 | Ohzawa et al. | 206/444 |

Primary Examiner—Paul T. Sewell
Assistant Examiner—M. Denise Patterson
Attorney, Agent, or Firm—Leon Gilden

[57] ABSTRACT

A plurality of storage trays are arranged for a stacked relationship relative to one another defined by side walls mounting projections on top surfaces of the side walls received within slots directed through bottom surfaces of an adjacent side wall of an overlying tray. The tray structure defines a cavity between a forward edge of a floor and a rear first wall. A rear second wall is spaced relative to the first wall to mount spaced flanges therewithin, wherein the flanges are further received within openings within an overlying tray. A ratchet plunger is positioned medially of the first rear wall to provide selective projection of a compact disc positioned on the floor in communication with the plunger. A modification of the invention includes an underlying support base formed with fiber optic cables directed through the support base and cooperative with fiber optic cable segments positioned within each of the overlying trays to provide visual indication of proper registration of each tray relative to one another, whereupon misalignment provides a discontinuity in an associated fiber optic cable line indicating such misalignment.

1 Claim, 5 Drawing Sheets

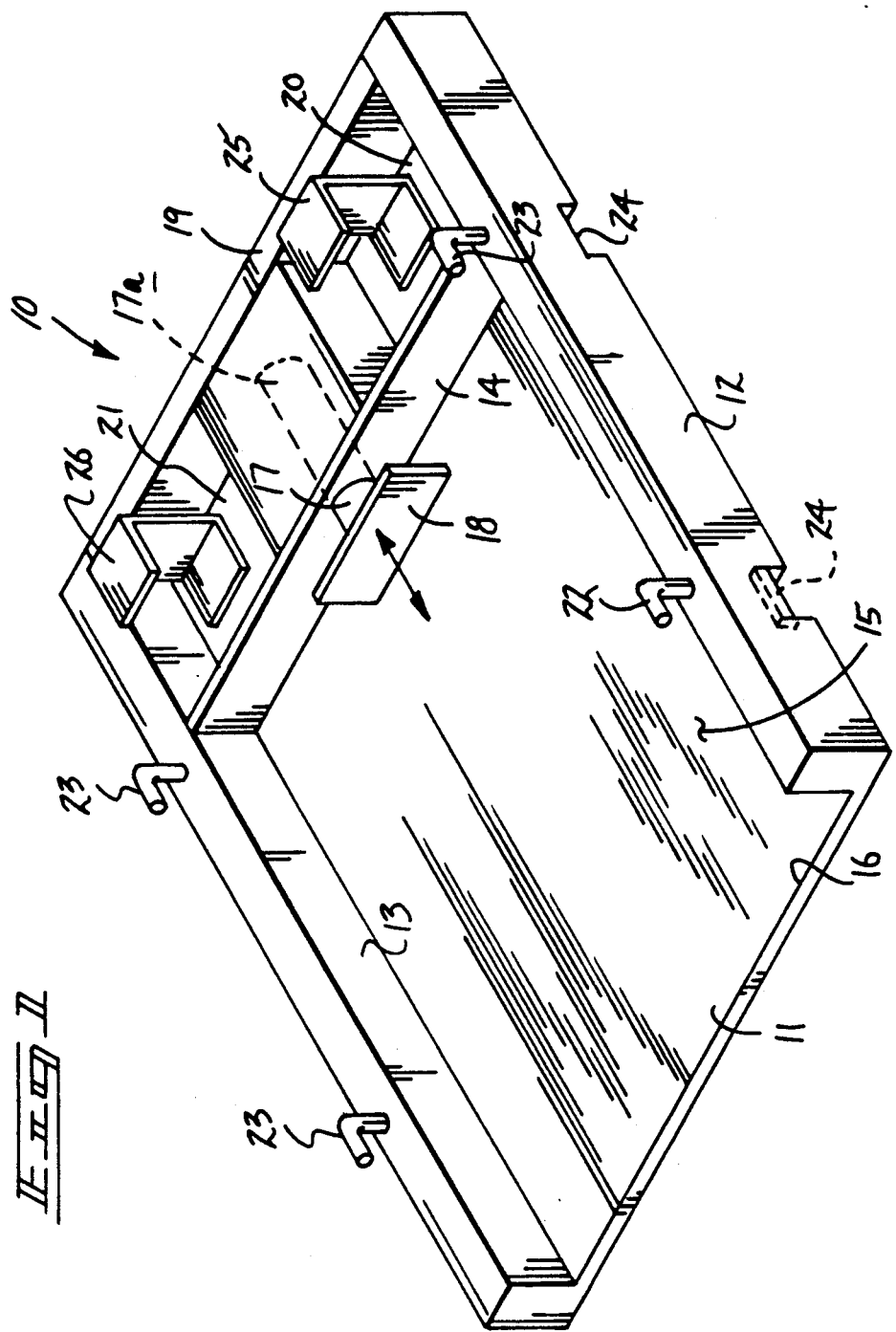

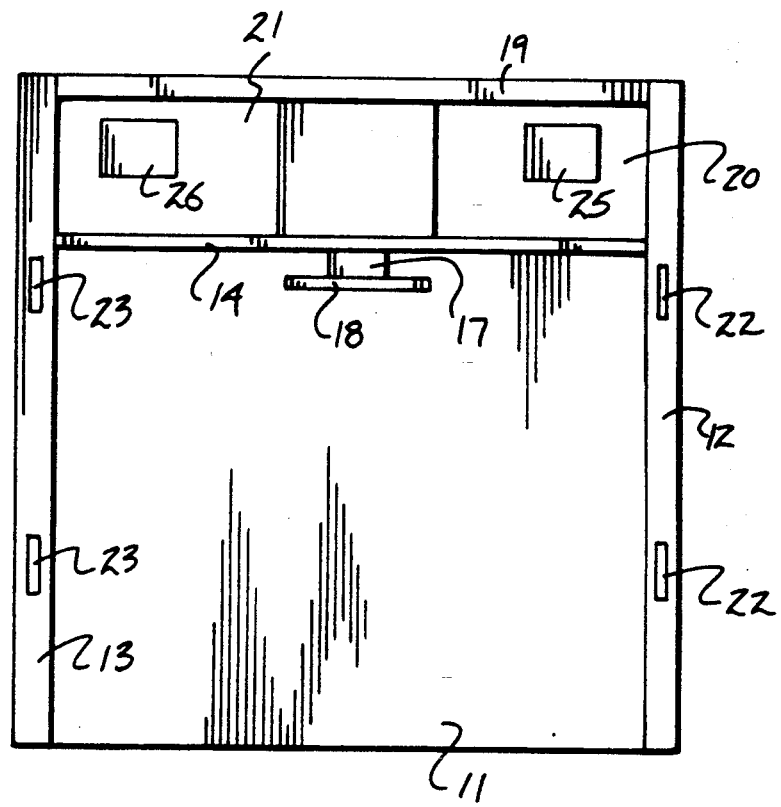
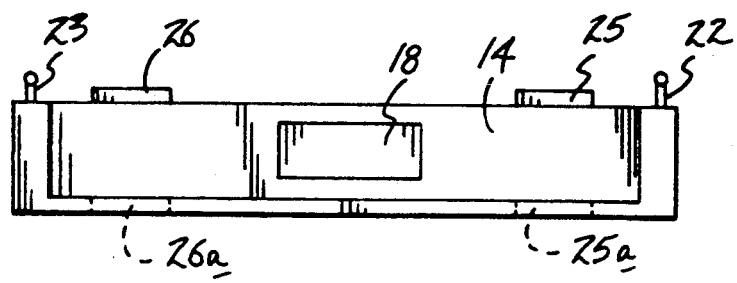

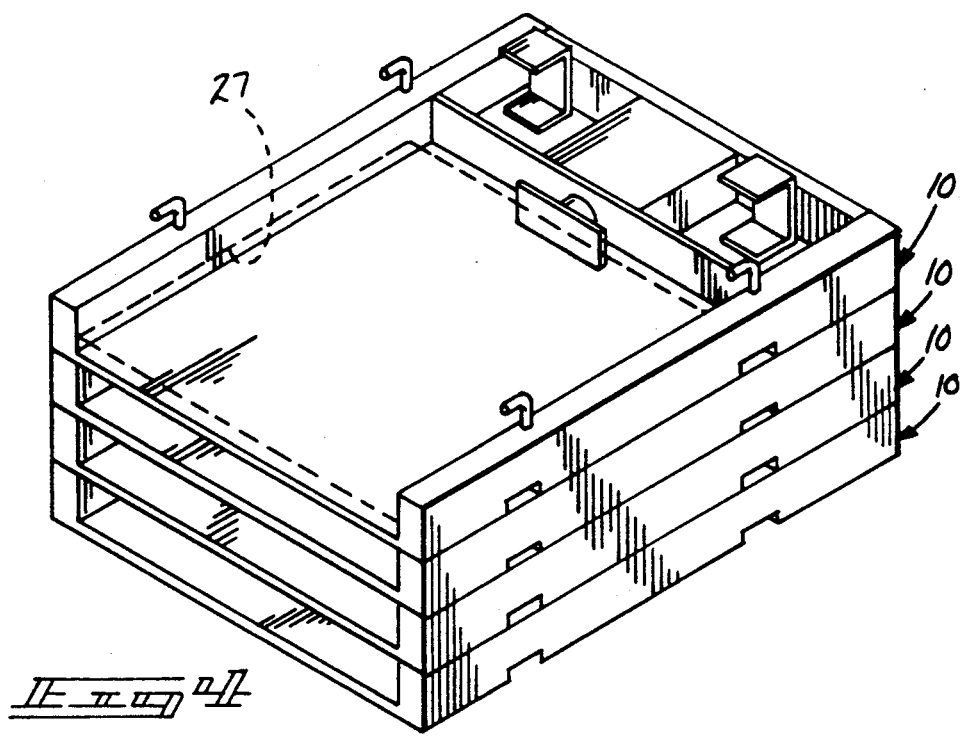
Fig. 4
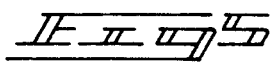
Fig. 5
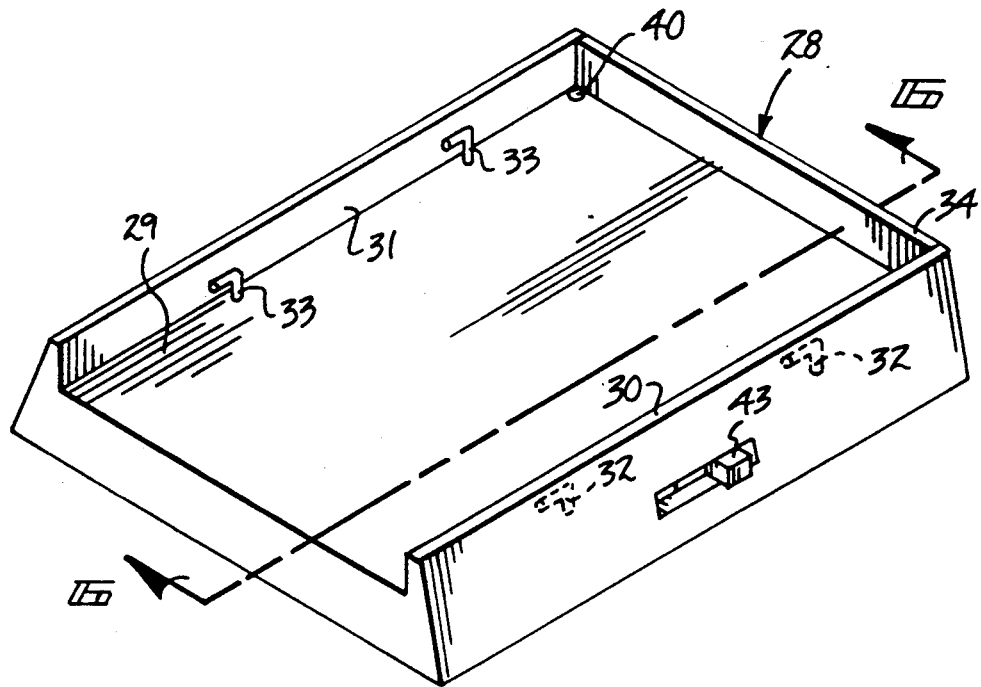

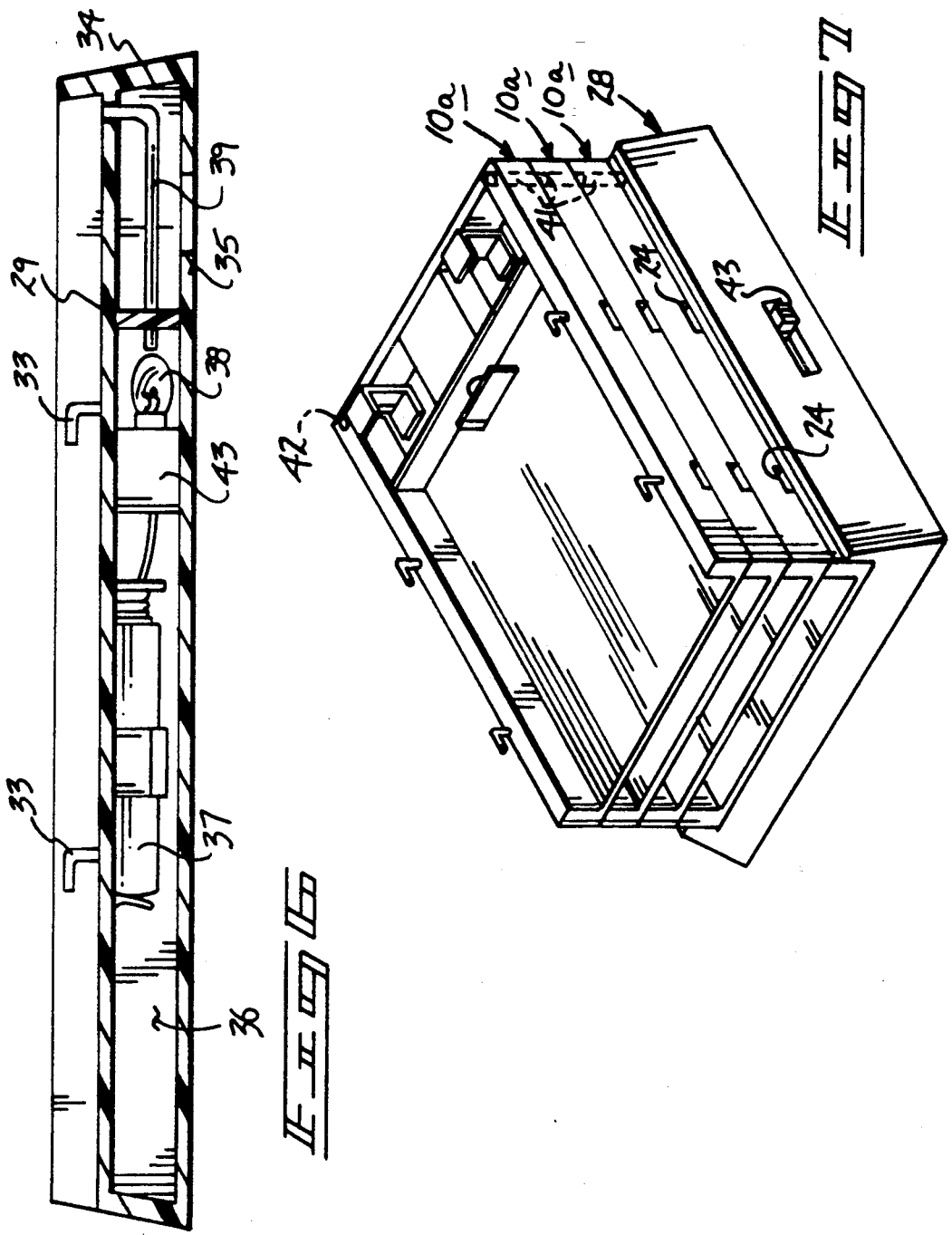

COMPACT AUDIO DISC STORAGE APPARATUS

BACKGROUND OF THE INVENTION

1. Field of the Invention

The field of invention relates to storage apparatus, and more particularly pertains to a new and improved compact audio disc storage apparatus wherein the same is arranged for stacking in a vertical nesting relationship for the storage and selective presentation of various compact discs contained within each tray.

2. Description of the Prior Art

Storage apparatus of various types is utilized in the prior art to accommodate a variety of items. Storage of planar recording mediums is exemplified in U.S. Pat. No. 4,884,685 to Ackeret utilizing a slider relative to wall portions for the presentation of various audio recording device discs.

U.S. Pat. No. 4,875,578 to Nehl sets forth a container for record carriers, to include compact discs, formed with an opened end for removal of such compact discs from a housing.

U.S. Pat. No. 4,867,311 to Metcalf sets forth a computer dispenser and storage organization utilizing a spring clip mechanism to provide selective ejection of a computer disc from a housing.

U.S. Pat. No. 4,915,820 to Ackeret sets forth a further example of a compact disc storage container for removal of a slider relative to a housing for presentation of a disc contained therewithin.

As such, it may be appreciated that there continues to be a need for a new and improved compact audio disc storage apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of storage apparatus now present in the prior art, the present invention provides a compact audio disc storage apparatus wherein the same utilizes a series of stacked tray structures, with each structure arranged for the selective presentation of a compact disc container therewithin. As such, the general purpose of the present invention, which will be described subsequently in greater detail, is to provide a new and improved compact audio disc storage apparatus which has all the advantages of the prior art storage apparatus and none of the disadvantages.

To attain this, the present invention provides a plurality of storage trays arranged for a stacked relationship relative to one another defined by side walls mounting projections on top surfaces of the side walls received within slots directed through bottom surfaces of an adjacent side wall of an overlying tray. The tray structure defines a cavity between a forward edge of a floor and a rear first wall. A rear second wall is spaced relative to the first wall to mount spaced flanges therewithin, wherein the flanges are further received within openings within an overlying tray. A ratchet plunger is positioned medially of the first rear wall to provide selective projection of a compact disc positioned on the floor in communication with the plunger. A modification of the invention includes an underlying support base formed with fiber optic cables directed through the support base and cooperative with fiber optic cable segments positioned within each of the overlying trays to provide visual indication of proper registration of each tray relative to one another, whereupon misalignment provides a discontinuity in an associated fiber optic cable line indicating such misalignment.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compact audio disc storage apparatus which has all the advantages of the prior art storage apparatus and none of the disadvantages.

It is another object of the present invention to provide a new and improved compact audio disc storage apparatus which may be easily and efficiently manufactured and marketed.

It is a further object of the present invention to provide a new and improved compact audio disc storage apparatus which is of a durable and reliable construction.

An even further object of the present invention is to provide a new and improved compact audio disc storage apparatus which is susceptible of a low cost of manufacture with regard to both materials and labor, and which accordingly is then susceptible of low prices of sale to the consuming public, thereby making such compact audio disc storage apparatus economically available to the buying public.

Still yet another object of the present invention is to provide a new and improved compact audio disc storage apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a tray structure utilized by the instant invention.

FIG. 2 is a top orthographic view of the tray structure utilized by the instant invention.

FIG. 3 is an orthographic front elevational view of the tray structure.

FIG. 4 is an isometric illustration of the trays in a stacked relationship.

FIG. 5 is an isometric illustration of a base member utilized by the instant invention.

FIG. 6 is an orthographic view, taken along the lines 6—6 of FIG. 5 in the direction indicated by the arrows.

FIG. 7 is an isometric illustration of the base mounting a plurality of modified trays thereon.

DESCRIPTION OF THE PREFERRED EMBODIMENT

Figure 8:
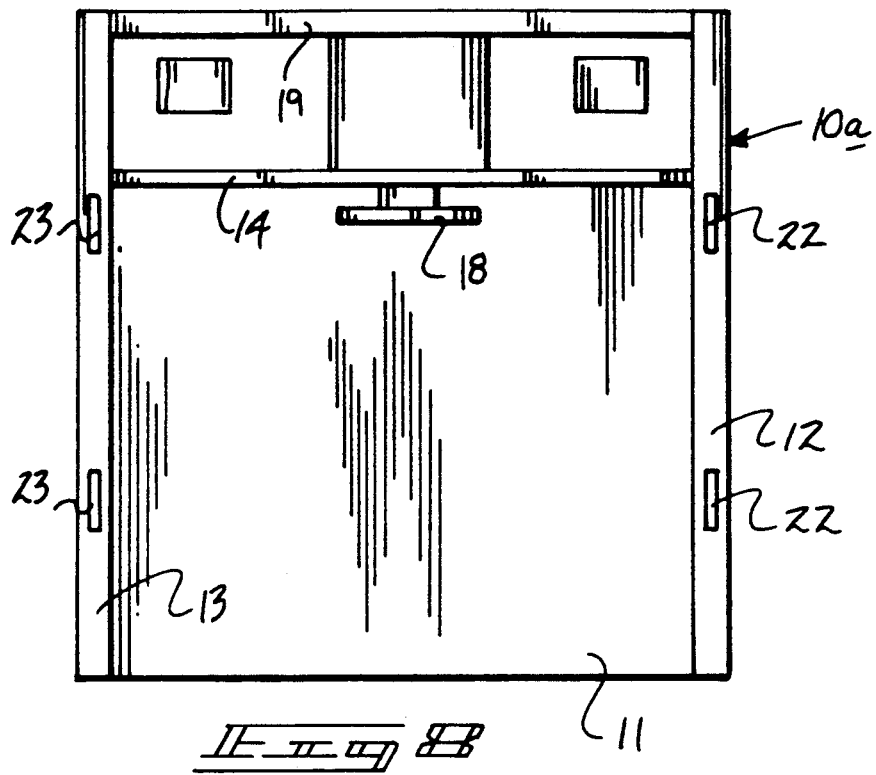
FIG. 8 is an orthographic top view of a modified tray structure utilized by the instant invention.
Figure 9:
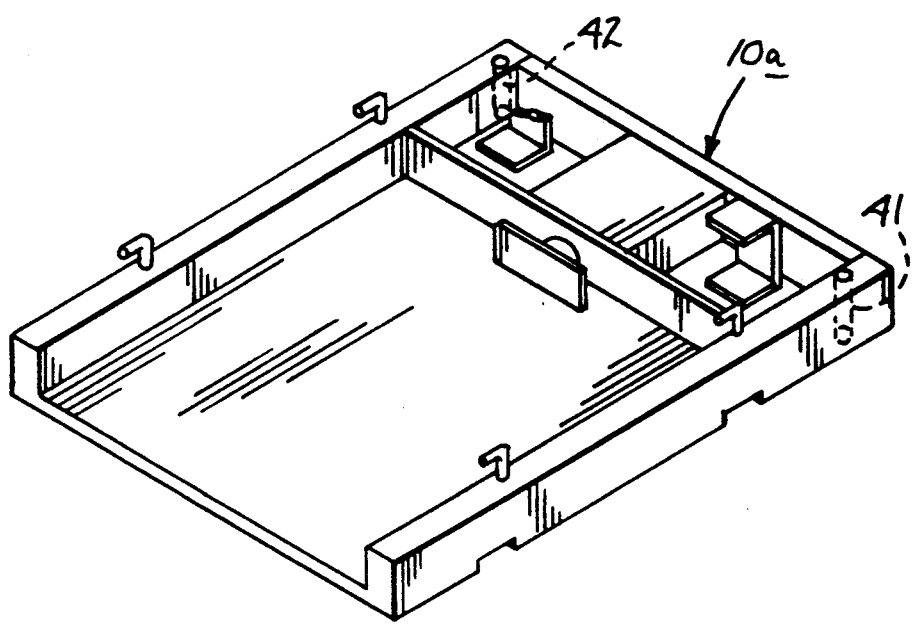
FIG. 9 is an isometric illustration of a modified tray structure utilized by the instant invention.

With reference now to the drawings, and in particular to FIGS. 1 to 9 thereof, a new and improved compact audio disc storage apparatus embodying the principles and concepts of the present invention and generally designated by the reference numeral 10 will be described.

More specifically, the compact audio disc storage apparatus 10 of the instant invention essentially comprises a plurality of tray members that are arranged for stacking in a vertical nested relationship, as illustrated in FIG. 4 for example. Each tray member includes a floor plate 11, with a spaced right and left side wall 12 and 13 respectively that are arranged parallel relative to one another and orthogonally mounted to the floor plate 11. A first rear wall 14 is spaced from and parallel a second rear wall 19, wherein the second rear wall 19 is orthogonally mounted between rear terminal ends of the side walls. A storage cavity 15 is defined between the first rear wall 14 and interior surfaces of the side walls, as illustrated. An entrance opening 16 permits access of various audio discs into the tray structure, as exemplified by audio disc 27 (FIG. 4) that is positioned adjacent and in contiguous communication with a plate member 18 of a plunger drive 17. The plunger mechanism 17a is positioned within a housing between the first rear wall 14 and the second rear wall 19. To each side of the plunger mechanism 17a is a respective right and left cavity 20 and 21 mounting a respective right and left mounting flange 25 and 26 that is received within respective flange recesses 25a and 26a through a floor plate of an overlying tray. The right and left walls each include a top respective right and left top surface, with each right and left top surface mounting a plurality of projections defined by right and left projections 22 and 23. The projections 22 and 23 are received within respective side wall projection receiving cavities 24 positioned through lower surfaces of the side walls. These projections permit proper registration of the trays and alignment of the trays when in a stacked relationship, as illustrated in FIG. 4.

In use, a compact disc 27 is positioned within the storage cavity 15 against a plate member 18. To remove the disc member, particularly when the trays are in a stacked relationship, an individual merely manually depresses the tray against the associated plate member 18, wherein the plunger drive 17 projects the disc from interiorly of the cavity 15.

FIGS. 5-9 illustrate a modified apparatus utilizing modified trays 10a, and includes a support base 28, as illustrated in FIG. 5. The support base 28 includes a base top floor 29 spaced above and parallel a base lower floor 35 defining an enclosed cavity therebetween (see FIG. 6). A base right side wall is spaced from and parallel a base left side wall, with the base rear wall 34 defining a receiving pocket for the modified tray members 10a, as illustrated in FIG. 7. The base top floor includes respective right and left base projections 32 and 33 respectively to be received within the respective side wall projection receiving cavities 24, in a manner as discussed above. The enclosed cavity 36 includes a battery 37 and an illumination bulb 38 operative through a switch 43 to effect selective illumination of the illumination bulb 38. A right and left fiber optic cable 39 and 40 respectively is directed through the cavity 36 and is positioned through the top floor 29 adjacent an intersection of the rear wall 34 and each respective right and left side wall 30 and 31. These right and left fiber optic cables 39 and 40 are to aligned with respective right and left fiber optic cable segments 41 and 42 respectively that project through each of the right and left side walls 12 and 13 of a modified tray member 10a. The predetermined width defined between exterior surfaces of the right and left side walls 12 and 13 are substantially equal to a predetermined further width defined between interior surfaces of the right and left base side walls 30 and 31 to align the right and left fiber optic cables 39 and 40 with respective right and left fiber optic cable segments 41 and 42 of each modified tray 10a. In this manner, when the trays are properly aligned in a manner as illustrated in FIG. 7, the fiber optic cable segments 41 and 42 are in linear alignment to permit light to be visible through an upper terminal end of an uppermost tray member 10a to provide visual indication of proper alignment and registration of each of the trays relative to one another. In this manner, utilization of the structure is not undertaken until such proper alignment is checked to ensure safe storage when there is compact audio discs 27 to be contained within the apparatus.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A compact audio disc storage apparatus, comprising, a plurality of tray members, each tray member including a floor plate, a right side wall, and a left side wall orthogonally mounted to the floor plate, with the right side wall and left side arranged in a parallel relationship, and a first rear wall orthogonally directed between the right side wall and left side wall, and a second rear wall spaced rearwardly and parallel to the first rear wall, with the second rear wall orthogonally mounted to a rear right terminal end of the right side wall and a rear left side of the left side wall, and a plunger drive orthogonally and medially mounted through the first rear wall mounted within a drive mechanism contained between the first rear wall and the second rear wall, and a plate member orthogonally mounted to a forward terminal end of the plunger drive for providing selective ejection of a compact audio disc positioned upon the floor plate in contiguous communication with the plate member between the right side wall and the left side wall, and the right side wall includes a right side wall top surface, the right side wall top surface includes a plurality of right projections orthogonally mounted thereon, and a plurality of left projections orthogonally mounted to the left side wall top surface, and the right side wall and the left side wall each including a plurality of projection receiving cavities directed through a bottom surface of the respective right side wall and the left side wall for reception of the projections by an overlying tray member, and a right mounting flange and a left mounting flange are mounted between the first rear wall and the second rear wall on opposed sides of the plunger drive, and the right mounting flange and the left mounting flange are received within respective recesses within an overlying tray member, and further including a support base, the support base including a base top floor spaced above a base bottom floor defining a cavity therebetween, and the support base includes a base right side wall and a base left side wall orthogonally mounted to opposed sides of the base top floor, and a base rear wall orthogonally mounted to the base right side wall and the base left side wall at rear terminal ends of the base right side wall and the base left side wall, and an illumination bulb, a battery, and a switch member directed through a base right side wall for effecting selective illumination of the illumination bulb, and a right fiber optic cable positioned in adjacency relative to the illumination bulb and projecting through and in planar alignment with the base top floor, and the base top floor is defined by a predetermined width, and the predetermined spacing between an exterior surface of the right side wall and the left side wall, and each right side wall and left side wall of each tray member includes a right fiber optic cable segment and a left fiber optic cable segment directed through the respective right side wall and left side wall adjacent the second rear wall, wherein the right fiber optic cable segment and the left fiber optic cable segment are in alignment with the right fiber optic cable and the left fiber optic cable when each tray member is positioned in aligned registration with the support base.

* * * * *